US008082418B2

(12) United States Patent
Stillwell, Jr. et al.

(10) Patent No.: US 8,082,418 B2
(45) Date of Patent: Dec. 20, 2011

(54) METHOD AND APPARATUS FOR COHERENT DEVICE INITIALIZATION AND ACCESS

(75) Inventors: Paul M. Stillwell, Jr., Aloha, OR (US);
Nagabhushan Chitlur, Portland, OR (US); Dennis Bradford, Portland, OR (US); Linda Rankin, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 574 days.

(21) Appl. No.: 11/958,080

(22) Filed: Dec. 17, 2007

(65) Prior Publication Data

US 2010/0077179 A1    Mar. 25, 2010

(51) Int. Cl.
*G06F 15/00* (2006.01)
*G06F 15/76* (2006.01)
*G06F 9/00* (2006.01)
*G06F 9/24* (2006.01)
*G06F 15/177* (2006.01)

(52) U.S. Cl. ................................... 712/15; 713/1; 713/2

(58) Field of Classification Search ........................ None
See application file for complete search history.

(56) References Cited

U.S. PATENT DOCUMENTS

| 6,088,795 | A  | * | 7/2000  | Vorbach et al. ............... 713/100 |
| 6,496,503 | B1 |   | 12/2002 | Pelissier |
| 7,181,609 | B2 |   | 2/2007  | Connor |
| 7,714,870 | B2 |   | 5/2010  | Johnson |
| 2006/0107027 | A1 |   | 5/2006 | Chen |
| 2007/0277161 | A1 | * | 11/2007 | Herbordt et al. ............... 717/140 |
| 2008/0052463 | A1 |   | 2/2008 | Chitlur |
| 2008/0148024 | A1 |   | 6/2008 | Wolrich |
| 2009/0089468 | A1 |   | 4/2009 | Chitlur |
| 2009/0089475 | A1 |   | 4/2009 | Chitlur |

* cited by examiner

*Primary Examiner* — Eddie P Chan
*Assistant Examiner* — William Partridge
(74) *Attorney, Agent, or Firm* — Caven & Aghevli LLC (57) ABSTRACT

A method and apparatus for enabling usage of an accelerator device in a processor socket is herein described. A set of inter-processor messages is utilized to initialize a configuration/memory space of the accelerator device. As an example, a first set of inter-processor interrupts (IPIs) is sent to indicate a base address of a memory space and a second set of IPIs is sent to indicate a size of the memory space. Furthermore, similar methods and apparatus' are herein described for dynamic reconfiguration of an accelerator device in a processor socket.

16 Claims, 5 Drawing Sheets

| | Destination 205 | Sequence # 211 | Data 212 |
|---|---|---|---|
| 250 | 011 | 0000 | Data start init |
| 251 | 011 | 0001 | Base bits [0:3] |
| 252 | 011 | 0010 | Base bits [4:7] |
| 253 | 011 | 0011 | Base bits [8:11] |
| 254 | 011 | 0100 | Base bits [12:15] |
| 255 | 011 | 0101 | Base bits [16:19] |
| 256 | 011 | 0110 | Base bits [20:23] |
| 257 | 011 | 0111 | Base bits [24:27] |
| 258 | 011 | 1000 | Base bits [28:31] |
| 259 | 011 | 1001 | Base bits [32:35] |
| 260 | 011 | 1010 | Size bits [0:3] |
| 261 | 011 | 1011 | Size bits [4:7] |
| 262 | 011 | 1100 | Size bits [8:11] |
| 263 | 011 | 1101 | Size bits [12:15] |

METHOD AND APPARATUS FOR COHERENT DEVICE INITIALIZATION AND ACCESS

FIELD

This invention relates to the field of computer systems and, in particular, to accelerator devices in computer systems.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. In addition, computer systems have evolved to encompass numerous different functions, such as traditional computing systems, media storage systems, entertainment centers, audio playback, video playback, servers, etc.

As a result, the number of input/output devices to be included in computer systems have also grown exponentially. Often, to support functions that may provide too much of a load for processors in the computer system or are targeted at providing functions that a processor architecture is not fundamentally designed for, an accelerator device may be included in the computer system. The most common example of an accelerator is a graphics accelerator, which provides processing power to perform graphic and display computations. However, an accelerator may include any logic to aid a processor in execution. Other examples may include, a math accelerator, a matrix inversion accelerator, a video compression accelerator, a memory access accelerator, and a network accelerator.

Yet, when a single accelerator is included in a system, that specific accelerator is limited to its default intended use. Furthermore, these accelerators are often located "below" a chipset, i.e. off of an memory controller hub or interconnect controller hub through an Input/Output (I/O) bus, such as Peripheral Component Interconnect (PCI) or PCI Express. As a result, these accelerators are commonly initialized through predefined I/O bus protocols and initialization procedures. However, memory access latencies are much longer for a device sitting off an I/O bus as compared to a processor in socket.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific accelerators, specific accelerator implementation logic, specific inter-processor messages, specific memory mapping/addressing techniques etc. in order to provide a thorough understanding of the present invention. It will be apparent, however, to one skilled in the art that these specific details need not be employed to practice the present invention. In other instances, well known components or methods, such as accelerator architecture/design, address translation, device initialization code/commands, and specific operational details of computer systems, have not been described in detail in order to avoid unnecessarily obscuring the present invention.

The method and apparatus described herein are for enabling usage of an accelerator in a processor socket. Specifically, enabling usage of an accelerator is primarily discussed in reference to a multi-processor computer system capable of sending and receiving inter-processor interrupts. However, the methods and apparatus described herein are not so limited, as they may be implemented on or in association with any integrated circuit device or system, such as cell phones, personal digital assistants, embedded controllers, mobile platforms, desktop platforms, and server platforms, as well as in conjunction with any type of inter-processor communication.

Figure 1:
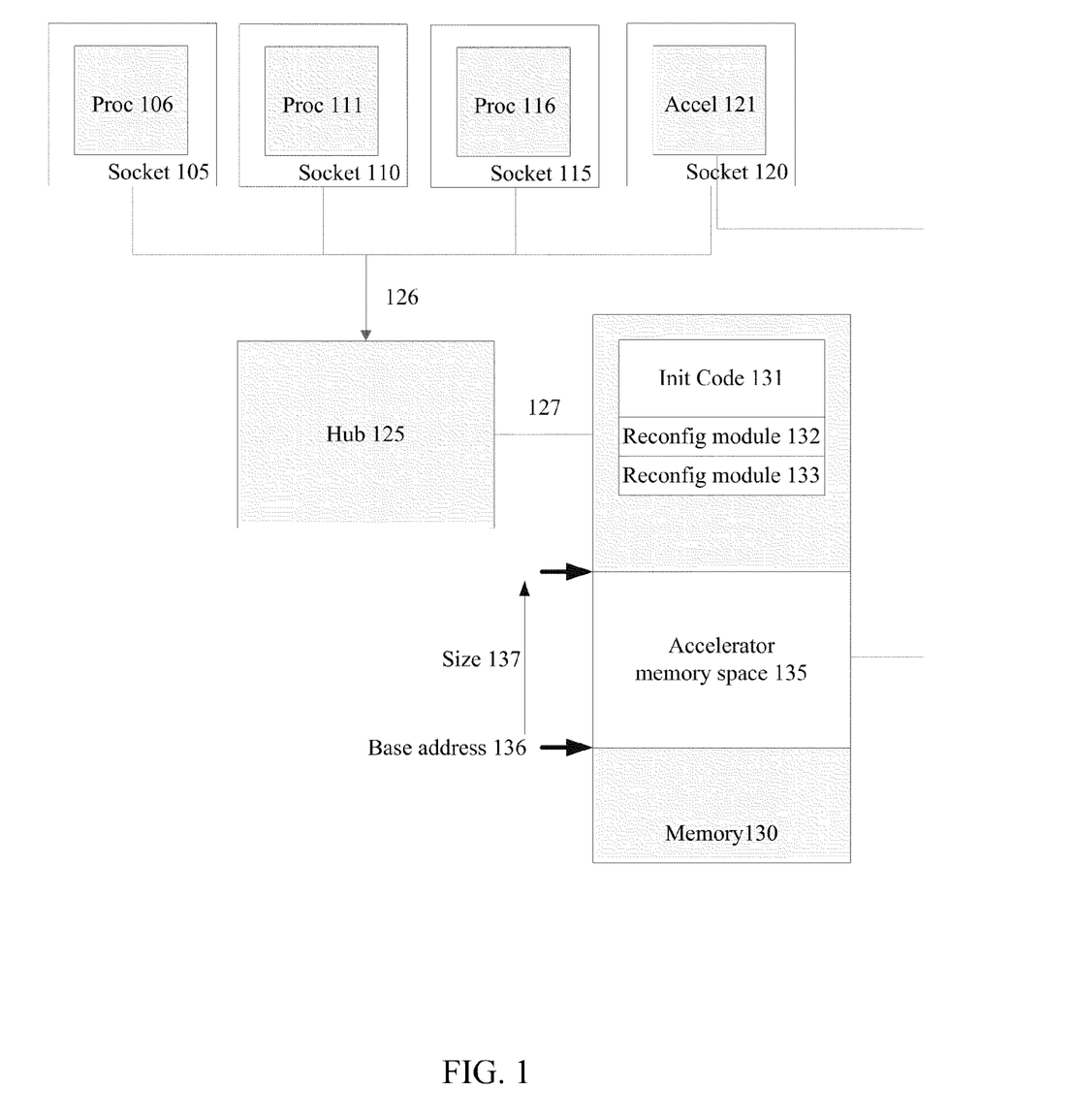
FIG. 1 illustrates an embodiment of a system including capable of initializing an accelerator in a processor socket.

Referring to FIG. 1, an embodiment of a system capable of enabling usage of an accelerator device in a processor socket is illustrated. As depicted, the computer system includes four processor sockets: 105, 110, 115, and 120. Yet, any number of processor sockets may be included in a computer system. Sockets 105, 110, 115, and 120 are coupled to hub 125. In one embodiment, hub 125 resembles a chipset. Often a chipset comprises two integrated circuit devices, such as a memory controller hub (MCH) and an interconnect controller hub (ICH). In one embodiment Hub 125 is the MCH coupling processors 106, 111, and 116, as well as accelerator 121, to memory 130.

As illustrated, sockets 105, 110, 115, and 120 are coupled to hub 125 through interconnect 126. In one embodiment, interconnect 126 is a front-side bus (FSB). An example of a common FSB includes a multi-drop parallel bus. Another example includes a serial point-to-point differential bus, such as a Quickpath Architecture. However, interconnect 126 may include any bus or interconnect, such as a Gunning Transceiver Logic (GTL) bus, a GTL+bus, a double data rate (DDR) bus, a differential bus, a cache coherent bus, a point-to-point bus, a multi-drop bus, a serial bus, a parallel bus, or other known interconnect implementing any known bus protocol.

Processors 106, 111, and 116 are coupled in sockets 105, 110, and 115, respectively. Note that coupling of devices in sockets may include any coupling, such as electrical coupling. In one embodiment, a package and corresponding socket technology is utilized. Examples of common socket technologies utilized today include a Land-Grid Array (LGA) package/socket, a Pin Grid Array (PGA) package/socket, and a Ball Grid Array (BGA) package/socket. However, any known apparatus for electrically coupling processors 106, 111, and 116 into sockets 105, 110, and 115 may be utilized. Furthermore, a socket may refer to any apparatus for electrically coupling a device, such as accelerator 121, to a circuit board. Processors 106, 111, and 116 are often referred to as physical processors, but may include any style of processing element, such as a microprocessor, an embedded processor, a multi-core processor, a multi-threaded processor, or a signal processor.

Accelerator device 121 is also electrically coupled in processor socket 120. As above, accelerator device 121 potentially includes packaging to be coupled in a corresponding processor socket. Often, sockets have a specific land, bump, pin, or other contact patterns including specific signal, power, and ground contacts, which couple accordingly to a printed circuit board (PCB). As a result, in one embodiment, the package or contacts of accelerator device 121 are placed to match the configuration of contacts for socket 120. Therefore, instead of an accelerator resembling an I/O add-in card, the accelerator, in one embodiment, may physically resemble a processor, in that the accelerator may include a similar processor pin/bump out, as well as a package matching a corresponding socket configuration. However, a conversion package may be utilized to couple an existing accelerator device in a processor socket.

In one embodiment, an accelerator includes a device or logic to accelerate a processing function. As an example, a processor executing code is able to perform some function, such as matrix inversion, during a number of execution cycles. A matrix inversion accelerator may be able to perform matrix inversion in a smaller number of cycles, as it is specifically tailored to perform such computations.

In the alternative, the accelerator may not be able to perform the function, such as matrix inversion, at a faster rate or even an equal rate than a processor, but the accelerator potentially provides parallelization capacity for the processing function. For example, assume a floating point computation accelerator performs floating point calculations slower than a processor with a floating point unit. Yet, the floating point computation accelerator is deemed an accelerator, as the accelerator is specifically tailored to provide another floating point execution unit for parallel floating point execution. Therefore, in one embodiment, accelerators do not have as diverse execution capability as a processor, and in fact, the accelerator in some embodiments may only be capable of performing a single acceleration task/function at a time. However, in other embodiment, an accelerator may be physically or logically portioned similarly to a multi-core or multi-threaded processor, with each portion capable of accelerating different tasks/functions.

Examples of processing functions/tasks that an accelerator device may accelerate include a matrix inversion task, a graphics computation task, a floating point computation task, a memory access task, a network access task, a compression task, a decompression task, an encryption task, a decryption task, an authentication task, a mathematical computation task, and a media task. The most typical example of an accelerator includes an I/O accelerator, such as a graphics accelerator, which is often coupled to an MCH off a peripheral connection bus.

In one embodiment, accelerator device 121 is implemented on an integrated circuit. Examples of a logic device to implement accelerator device 121 includes a Programmable Array Logic (PAL) device, a Programmable Logic Device (PLD), a Complex Programmable Logic Device (CPLD), a Field Programmable Gate Array (FPGA) device, an Application Specific Integrated Circuit (ASIC) device. In one embodiment, accelerator device 121 is a static accelerator, which is designed and implemented to accelerate a fixed number of tasks/functions. In another embodiment, accelerator 121 is capable of being dynamically reconfigured to accelerate different functions at different times. Reconfiguration of accelerator 121 is discussed below in reference to characters 132-133 and FIG. 5.

Memory 130, as illustrated includes a system memory, to hold initialization code 131, reconfiguration modules 132-133, and accelerator memory space 135. An example of system memory includes dynamic random access memory (DRAM). However, any memory may be utilized for system memory, such as double data rate (DDR) memory, synchronous DRAM (SDRAM), buffered memory, and other known memory devices. Additionally, memory 130 is not limited to a system memory, and may include other known memory devices, such as a flash memory device.

In fact, the code, modules, and memory space illustrated in memory 130 may be held in a single memory device as illustrated or independently held in separate memory devices. For example, a first portion of initialization code 131, such as Basic Input/Output Software (BIOS) or Extensible Firmware Interface (EFI) code, to initialize the computer system and communicate with hardware at runtime may be held in a flash memory device, while a second portion of initialization code 131, such as a device driver for accelerator 121, may be initially held in long-term storage, such as a hard drive, and loaded into system memory at runtime or held in another device, such as an article of manufacture.

As stated above, initialization code 131 may include many forms of code for system or device initialization. In one embodiment, initialization code 131 includes BIOS or EFI code to be executed on a processor, such as processor 106, upon boot of the computer system to initialize the system. As an example, when executing boot code, it is determined that socket 120 includes accelerator device 121. Here, boot code may also include code to initialize accelerator device 121 as described below.

In another embodiment, initialization code 131 includes code to be executed on a processor, such as processor 106, to initialize a memory space for accelerator 121. Often, a single processor is designated to execute system management code or initialization code; however, any processor including all processors 106, 111, and 116 in parallel may execute initialization code 131. Here, initialization code 131 may resemble or include a device driver. Often with an accelerator device sitting below hub 125, a device driver, when executed, maps configuration registers of the device to a shared memory space utilizing specified peripheral bus constructs/protocols, such as specified PCI-Express protocols.

As illustrated here, the computer system is to communicate with accelerator device 121 through configuration space 135 in system memory. Therefore, in one embodiment, for the system and accelerator device 121 to comprehend the location of memory space 135, the device driver/initialization code being executed on a processor, such as processor 106, initializes memory space 135 for accelerator 121. In other words, the memory space is allocated and communicated to accelerator 121, so accelerator 121 is able to comprehend its associated memory space. To illustrate, an oversimplified example is herein discussed. Upon reset, boot code held in a flash device, not illustrated, is executed, which determines that accelerator 121 is in socket 120. After initialization, an operating system loads device driver 131 for accelerator 121. Processor 106 executes device driver 131 causing processor 106 to transmit a set of inter-processor messages to socket 120, which was determined to be the socket including accelerator 121 during boot.

In one embodiment, these inter-processor messages provide base address 136 of accelerator memory space 135 and size 137 of accelerator memory space 135. As a result, memory space 135, which is defined by size 137 added to base 136, is associated with memory space 135. Here, writes to accelerator device 121, such as writes to registers of accelerator device 121, may be enabled through writes to memory space 135. Furthermore, memory space 135 may include mapped portions, such as specific addresses, designated for configuration information commonly held in registers of accelerator 121. Essentially, accelerator 121 is able to map its register space in memory 130, while being able to access main memory with much lower latency then if accelerator 121 were placed below hub 125 off an I/O interconnect.

Note that a similar manner of initialization and use of accelerator 121 may be utilized in a more secure execution environment, such as a Virtualization Architecture. Here, a hypervisor, such as a virtual machine monitor (VMM), is to provide an interface between software, such as virtual machines (VMs), and hardware, such as processors and memory. Often a hypervisor abstracts hardware to allow multiple guest applications to run independently on the hardware. Virtual machines may be an operating system, an application, guest software, or other software to be executed on the hardware. Continuing the example above, a device driver executing in a virtual machine may setup a similar memory space within a permissible memory range. Furthermore, the VMM may intercepts memory accesses to the memory range and handle/forward them accordingly.

However, regardless of the execution environment, in one embodiment, accelerator 121 is capable of being dynamically reconfigured. Often the usage model of a computer system changes from application to application and over time through different user experience. As a result, different functions or tasks are to be accelerated. Instead of physically switching out accelerator 121 every time a new processing task is to be accelerated, device 121 itself, may be reconfigured. As stated above, in one embodiment, accelerator device 121 is implemented utilizing reconfigurable logic, such as a Programmable Logic Device (PLD).

As illustrated, reconfiguration modules 132 and 133 when executed are to reconfigure accelerator 121. In one embodiment, reconfiguration modules 132 and 133 are code included in a device driver for accelerator 121. Essentially, a device driver provides a resemblance of a library of modules to reconfigure accelerator 121 to accelerate different functions. As an example, reconfiguration module 132, when executed, reconfigures accelerator device 121 to accelerate matrix inversions, while reconfiguration module 133, when executed, reconfigures accelerator device 121 to accelerate video compression.

In one embodiment, reconfiguration of accelerator 121 occurs dynamically during runtime of a computer system. As an illustrative example, processor 106 is executing a media application, which includes video compression. However, accelerator device 121 is configured to accelerate matrix inversion. As a result, processor 106 executes reconfiguration module 133 to reconfigure accelerator 121 to accelerate video compression. In one embodiment, processor 106, when executing reconfiguration module 133, transmits inter-processor messages, similar to the initialization messages described above, to reconfigure accelerator 121. In another example, processor 106, when executing reconfiguration module 133, writes to accelerator memory space 135 to reconfigure accelerator 121. Note that a combination of direct messaging and writing to memory space may be utilized, such as a direct message to indicate reconfiguration is going to occur and writes to memory to actually provide the commands for reconfiguration.

Figure 2A:
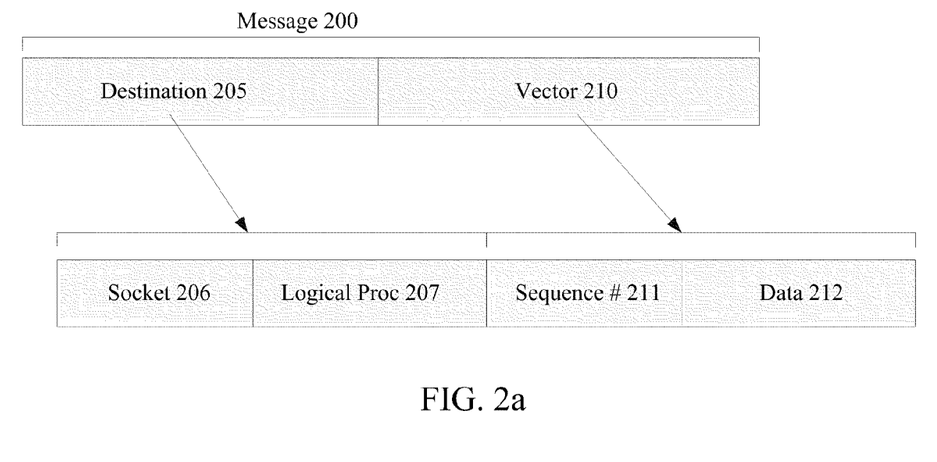
FIG. 2a illustrates an embodiment of a inter-processor message.

Turning to FIG. 2a an embodiment of a format for an inter-processor message is illustrated. In one embodiment, an inter-processor message includes an inter-processor interrupt (IPI). However, inter-processor message 200 includes any message to be routed between processor sockets 105, 110, 115, and 120, without writing to shared system memory. For example, a write to memory space 135, updates memory, which in turn is monitored by accelerator 121. As a result, a write to system memory associated with a device is often not referred to as an inter-processor message. In contrast, an inter-processor, such as a an IPI, may be directly routed to socket 120 based on an identifier referenced in a message or transaction.

As illustrated in FIG. 2a, inter-processor message 200 includes destination field 205 and vector 210. In one embodiment, destination 205 includes a reference to a socket including an accelerator device. For example, an IPI destination field often includes a value, wherein first portion 206 of the value identifies a socket and second portion 207 identifies a logical processor, such as a core or thread, to receive the IPI. To illustrate, inter-processor message 200, and specifically, socket field 206 of message 200, represents socket 120, for an inter-processor message transmitted to accelerator 121. Here, a default value or any other value may be included in logical processor field 207. Or in an implementation where an accelerator device includes multiple portions to accelerate different functions, logical processor field 207 may indicate an appropriate corresponding portion of the accelerator.

Furthermore, vector field 210 is to hold data or commands potentially supported by accelerator device 121. In one embodiment, vector 210 includes sequence number field 211 and data field 212. Here, sequence number field 211 is to identify the order of message 200 in a set of inter-processor messages. For example, in a bus system, such as a Quickpath architecture, which includes a serial point-to-point coherent architecture where bus transactions may be re-ordered, a sequence number in sequence field 211 allows accelerator device 121 to correctly order and aggregate inter-processor messages received out of order. However, in another embodiment, where sequence number field 211 is not utilized, data field 212 is potentially allocated a larger portion of vector 210. As stated above, data field 212 may include any information, such as data, commands, and instructions.

Figure 2B:
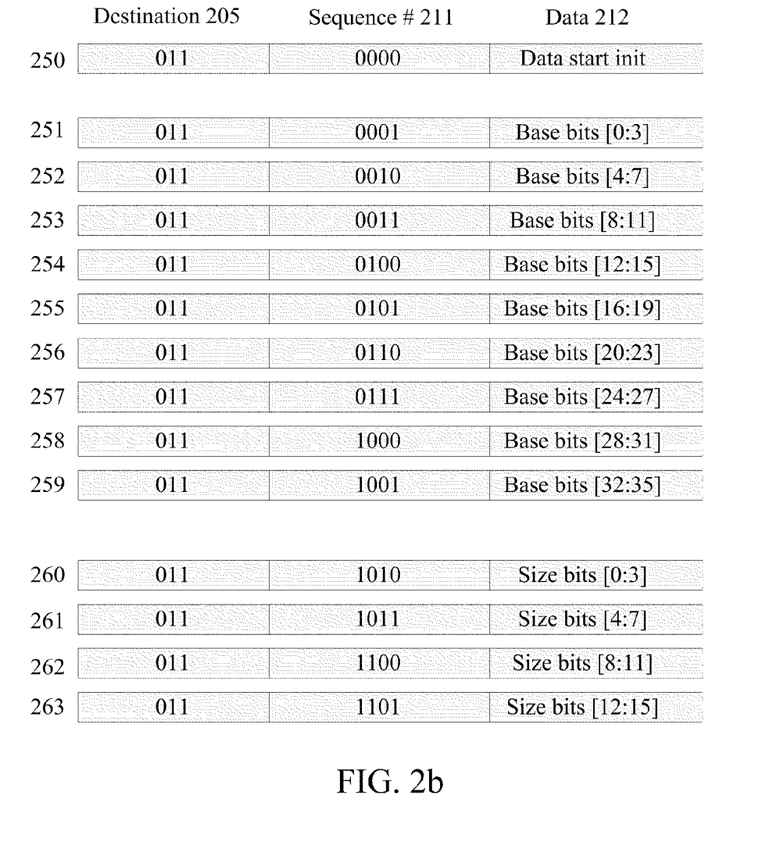
FIG. 2b illustrates an embodiment of a set of inter-processor messages to initialize a memory space for a device in a processor socket.

Referring next to FIG. 2b, an oversimplified embodiment of a set of IPIs to initialization a memory space for an accelerator device is illustrated. As illustrated, first IPI 250 is an initialization IPI transmitted to begin initialization of the accelerator device. Here, destination field 205 includes the decimal value of three, i.e. binary value of 011, to indicate the IPI is to be transmitted to socket three. For example, during boot of the system illustrated in FIG. 1, socket 105 is associated with socket number 0, socket 110 is associated with socket number 1, socket 115 is associated with socket number 2, and socket 120 is associated with socket number 3. Here, IPI 250 is routed to socket 3 including accelerator device 121 based on at least a portion of destination field 205 including a value identifying socket 3. Furthermore, as the first IPI in the set, sequence number field 211 of IPI 250 includes a value of zero.

In addition, data field 212 includes a value, which accelerator device 121, recognizes as an initialization value, i.e. a predefined "magic value." Based on the implementation, any predefined value may be utilized to indicate an initialization state. After the initialization IPI is received and comprehended by accelerator device 121, accelerator device 121 waits for IPI's to initialize its memory space. In one embodiment, a first number of IPIs, such as IPIs 251-259, to indicate a base address of a memory space to be associated with accelerator device 121. In the example illustrated, portions of the base address are transmitted in each IPI. Also, IPIs 251-259 are ordered 1-9, accordingly, in sequence field 211. Here, the base address has 36 bits, which are sent from Lowest Significant Bit (LSB) to Most Significant Bit (MSB). However, a different embodiment includes transmitting from MSB to LSB.

After, the first number of IPIs are transmitted, a second number of IPIs, such as IPI 260-263, are transmitted to indicate a size of the memory space. In one embodiment, the base address plus the size value defines the bounds of the memory space to be associated with an accelerator device. Similar to above, IPIs 260-263 identify socket 3 in destination field 205, indicate a sequence in the set in field 211, and include at least a portion of the size value in each IPI. Note, that portions of the size value may be transmitted from MSB to LSB or LSB to MSB. In addition, new ordering numbers may be restarted for each phase of initialization, such as restarting at zero for IPI 251 and zero for IPI 260. Moreover, in one embodiment, initialization IPI 250 is not transmitted before IPIs 251-259 or IPIs 260-263. Here, accelerator device 121, upon boot, enters an initialization state. As a result, initialization IPI 250 is not needed.

Initialization of a memory space for an accelerator device, as described above and below, in one embodiment, is in response to execution of code on a physical processor. For example, a device driver for accelerator device 121 is loaded into system memory 130 and executed on processor 106. As another example, the device driver or other initialization code is included on an article of manufacture, as described below, to be executed on processor 106. However, any code executed on processor 106 potentially results in initializing an accelerator device.

To illustrate, processor 106 when executing instructions, operations, function calls, etc. in code, such as a device driver or initialization code, is to transmit initialization IPIS, such as the set of IPIs illustrated in FIG. 2b to initialize memory space 135. Furthermore, the flows of FIGS. 3-5 may also be performed in response to execution of code by a physical processor or an accelerator device. Additionally, a compiler or other code, when executed, to compile or alter initialization code, may insert the instructions, operations, function calls, and other known executable values, that when executed, are to perform the flows illustrated in FIGS. 3-5.

Figure 3:
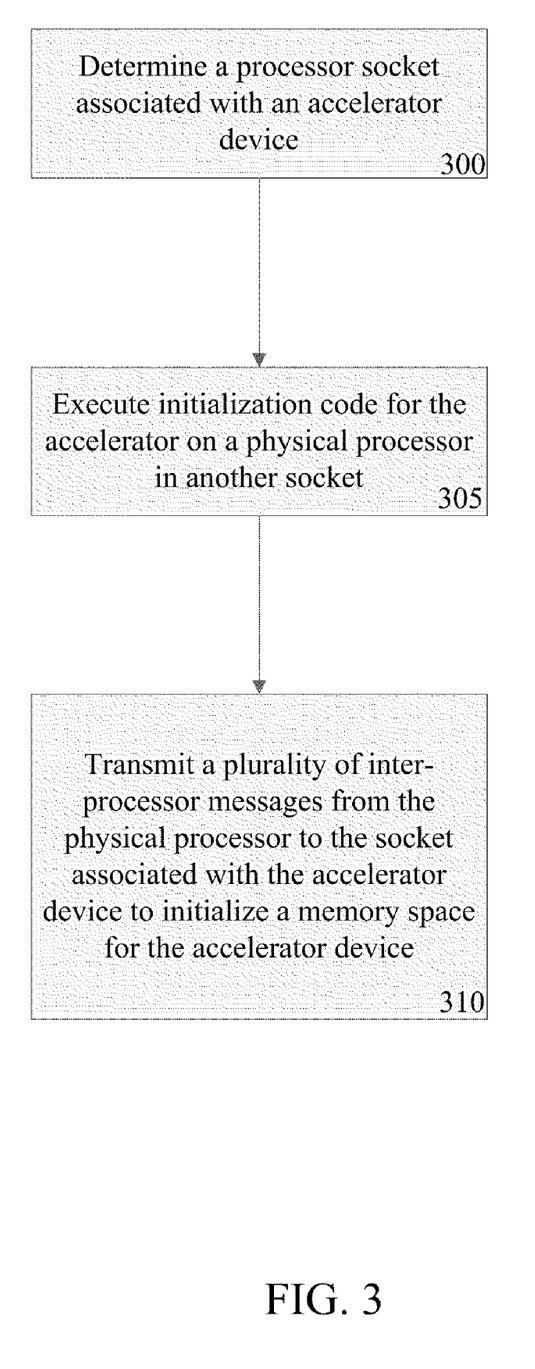
FIG. 3 illustrates an embodiment of a flow diagram for a method of initialization an accelerator in a processor socket.
Figure 4:
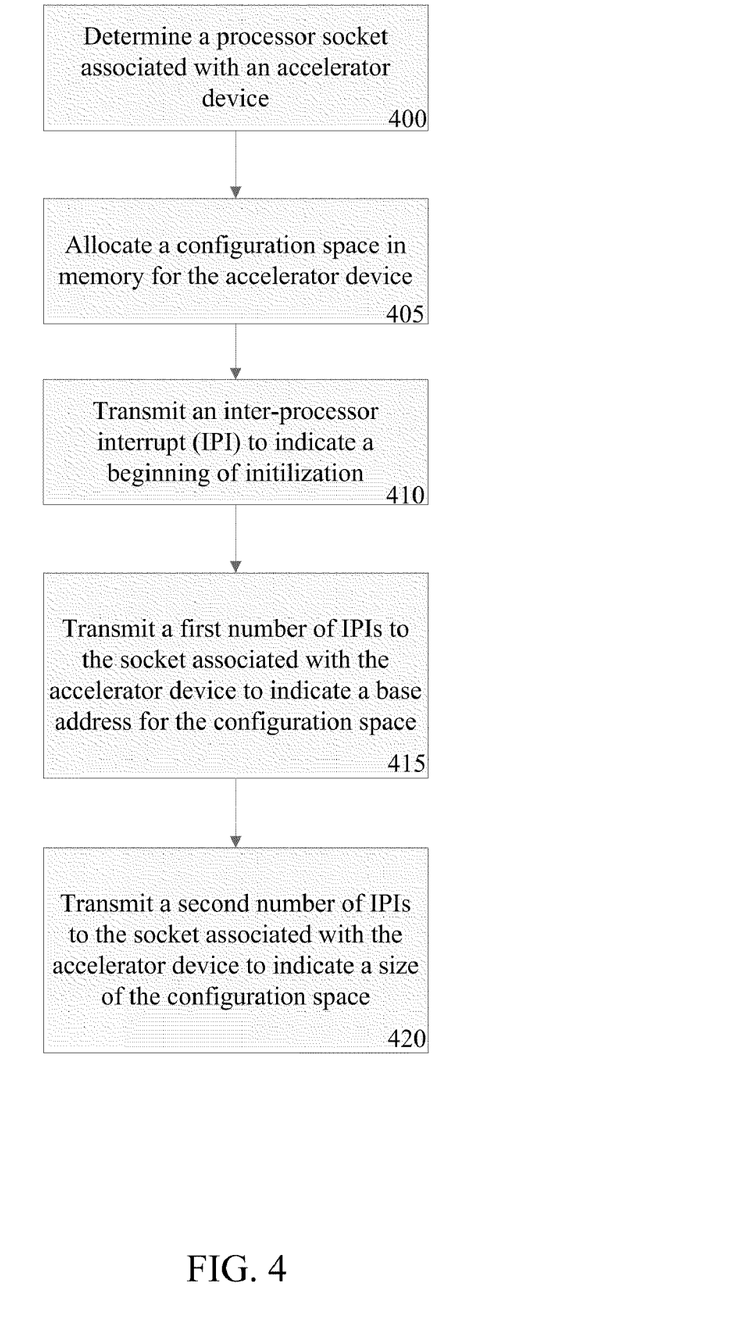
FIG. 4 illustrates an embodiment of a flow diagram for a method of initializing a memory space for an accelerator device in a processor socket.
Figure 5:
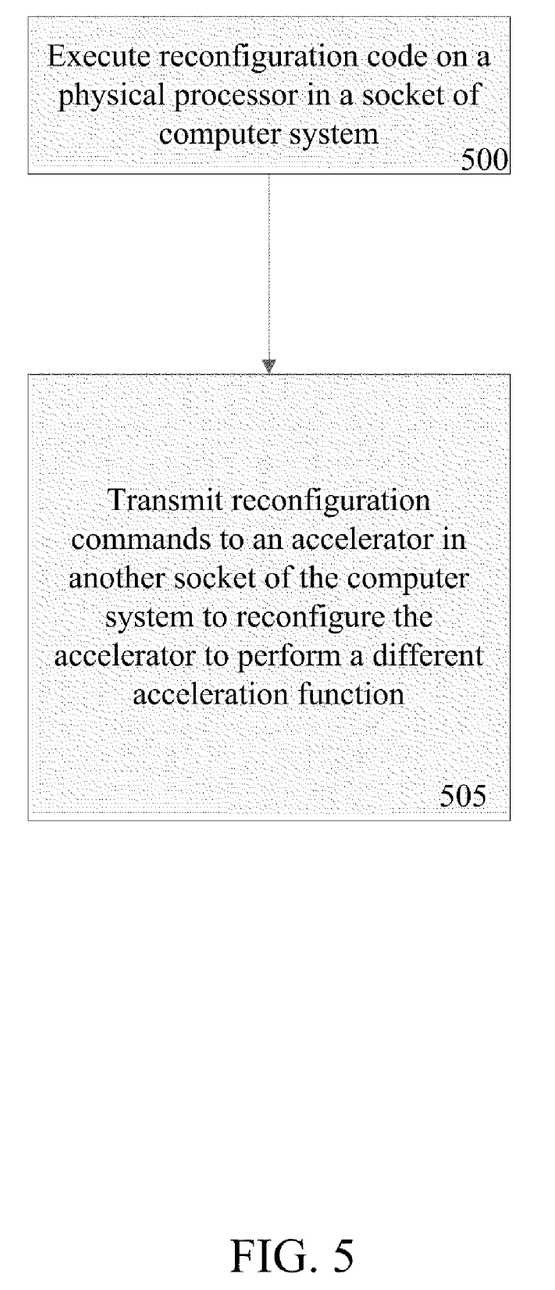
FIG. 5 illustrates an embodiment of a flow diagram for dynamically reconfiguring an accelerator device.

Although the flows of FIGS. 3-5 are illustrated in a substantially serial manner, any of the illustrated flows may take place in parallel with others. The specific order of flows illustrated in FIGS. 3-5 are purely illustrative. As a result, any flow may be performed in any order. For example, determining a processor socket associated with an accelerator device in flow 300 may take place during execution of initialization code in flow 305.

Turning to FIG. 3, an embodiment of a flow diagram for a method of initializing an accelerator device is illustrated. In flow 300, a processor socket associated with an accelerator device is determined. In one embodiment, boot code, when executed, is to initialize a computer system including the accelerator. During initialization sockets and their contents are identified. For example, a socket including an accelerator is polled during initialization. When executing the code, a number or other identifier is associated with the socket including the accelerator device. Other initialization tasks may also be performed, such as Power On Self Test (POST) and initialization of other tasks. Often code for booting a system, such as Basic Input Output Software (BIOS) code and/or Extensible Firmware Interface (EFI) code, is held in a memory device, such as a flash memory device.

In flow 305 initialization code for the accelerator is executed on a physical processor in another socket. In one embodiment, the initialization code for the accelerator device is included in the boot code held in the flash device. In another embodiment, the initialization code for the accelerator device is separate initialization code held in memory or on an article of manufacture capable of interfacing with the computer system. Here, during execution of the boot code a call to the initialization code for the accelerator may be executed. In another embodiment, the boot code completes execution and hands off control to an operation system or hypervisor. The hypervisor then loads and schedules execution of the initialization code, which here resembles device driver code.

The physical processor, in response to executing the initialization code, transmits a plurality of inter-processor messages from the physical processor to the socket associated with the accelerator device to initialize a memory space for the accelerator device in flow 310. In one embodiment, the inter-processor messages include inter-processor interrupts (IPIs). As an illustrative example, the inter-processor messages transmit a defined memory space. For example, a contiguous section of physical memory is allocated to the accelerator device. The inter-processor messages communicate the defined contiguous section of physical memory to the accelerator device. In one embodiment, the memory space is defined by a base address and a size value, which is transmitted utilizing the inter-processor messages.

A specific illustrative embodiment of a set of IPIs is illustrated in FIG. 2b. Here, a first initialization IPI is sent to place the accelerator device of socket 3 into an initialization mode. A first number of IPIs is transmitted to the accelerator device to indicate the base address. Note in an embodiment where sequence numbers are utilized, the accelerator device may receive the IPIs in a different order than intended. However, the accelerator is capable of re-ordering the IPIs into the intended order.

Furthermore, the accelerator is capable of aggregating data portions of the IPIs to form the entire base address from a plurality of base address IPIs. As an example, each set of bits from one base address IPI is masked into a corresponding correct position within a register until all of the transmitted data bits are held in the register. As another example, the bits are serially shifted into a register. Other known methods and of aggregating data portions or bits may be utilized. In a similar manner, a second number of IPIs to indicate a size value of the memory space is transmitted, received, re-ordered, and aggregated as described above in reference to the base address.

Turning to FIG. 4, a specific illustrative embodiment of a flow diagram for a method of initializing a configuration space is depicted. In flow 400, a processor socket associated with an accelerator device is determined. Any method described above in reference to FIG. 3 or any other known method for determining an identifier associated with a device in a processor socket may be utilized. Note that the accelerator device may be any acceleration device, as described above, for accelerating processing functions/tasks.

In flow 405, a configuration space in memory for the accelerator device is allocated. In one embodiment, an OS, a hypervisor, or other controlling code/application provides memory management. As a result, a memory space is provided by request of the OS, hypervisor, or controlling code. For example, with a hypervisor a space within a virtual machine (VM) memory space may be allocated. In one embodiment, the memory space or configuration space is allocated as physically contiguous. Therefore, the bounds of the entire memory space are definable by a base address and a size value. However, a non-contiguous space may be allocated where multiple base addresses and sizes define the configuration space.

Here, in flow 410, a first inter-processor interrupt (IPI) is transmitted to indicate a beginning of initialization. As an example, an instruction or operation may be compiled in initialization code or inserted by a compiler in initialization code. A physical processor in a computer system including the accelerator device, when executing the instruction or operation, is to generate/transmit the first IPI to the accelerator device. The processor socket determined in flow 400 is referenced in the first IPI to enable correct routing of the first IPI to the socket including the accelerator device. An example of a first initialization IPI is illustrated in FIG. 2b with reference character 250. There, destination field 205 indicates the IPI is to be routed to socket 3, has a sequence number of zero, i.e. the first IPI, and includes a start initialization value. Note the start initialization value may include any "magic value," which is recognizable by the accelerator as a command to enter an initialization state, i.e. wait for base address and size value IPIs.

Next, a first number of IPIs, is transmitted to the socket associated with the accelerator device to indicate a base address for the configuration space in flow 415 of FIG. 4. Referring back to FIG. 2b again, nine IPIs, i.e. IPIs 251-259, are sent to indicate the full base address, which there includes 36 bits. However, a base address may include any number of bits to reference an address and any number of IPIs may be sent to indicate a base address. Furthermore, bits may be transmitted in any increment, such as eight bits at a time, as well as in any order, such as MSB to LSB. The accelerator device is capable of aggregating the data portions of the first number of IPIs to form the correct full base address. Similarly, a second number of IPIs are sent to indicate a size value. Here, IPIs 260-261 indicate a 16 bit size value, when added to the 36 bit base address defines the bounds of the configuration space for the accelerator device. However, once again, the size value may include any number of bits and may be transmitted in different increments of bits per IPI and a different number if IPIs.

Referring next to FIG. 5, an embodiment of a flow diagram for a method of reconfiguring an accelerator device in a processor socket is illustrated. In flow 500, reconfiguration code is executed on a physical processor in a socket of a computer system. In one embodiment, the reconfiguration code is included in a device driver associated with the accelerator device. For example, as illustrated in FIG. 1, different reconfiguration modules may be included in the device driver, which resembles a library of reconfiguration modules. When an accelerator is to be reconfigured to perform a different processing function, the corresponding reconfiguration module is determined and executed to reconfigure the accelerator device. However, reconfiguration code and modules is not limited to inclusion in a device driver, and may be included in any storage device able to communicate with the computer system, such as an article of manufacture or other memory.

Next, in flow 505 reconfiguration commands are transmitted to an accelerator device in another socket of the computer system to reconfigure the accelerator to perform a different acceleration function. In one embodiment, a physical processor executing the reconfiguration code transmits similar inter-processor messages as described above. However, instead of an initialization command or "magic number" in a data field of the inter-processor message, a reconfiguration command or data value is transmitted to indicate the accelerator is to be reconfigured. Additionally, more inter-processor commands may be transmitted to reconfigure the device.

Alternatively, after a configuration space of the accelerator device is initialized, as described above, the physical processor, in response to executing the reconfiguration code, performs writes to the configuration space to reconfigure the accelerator device. However, note that inter-processor messaging and writes to a configuration space may be performed in cooperation. As a first example, an inter-processor message is sent to place the accelerator device in a reconfiguration state, i.e. wait for writes to the configuration space for reconfiguration. As another example, for extensive reconfiguration writes to the configuration space are performed, while minor reconfigurations are performed through inter-processor messaging.

As stated above, reconfiguration of an accelerator, in one embodiment, includes reconfiguring logic of an accelerator device from accelerating one processing function to accelerate a second processing function. Examples of processing functions/tasks that an accelerator device may accelerate include a matrix inversion task, a graphics computation task, a floating point computation task, a memory access task, a network access task, a compression task, a decompression task, an encryption task, a decryption task, an authentication task, a mathematical computation task, and a media task. The most typical example of an accelerator includes an I/O accelerator, such as a graphics accelerator, which is often coupled to an MCH off a peripheral connection bus.

An accelerator device may be implemented on an integrated circuit or other logic. Examples of a logic device to implement an accelerator device include a Programmable Array Logic (PAL) device, a Programmable Logic Device (PLD), a Complex Programmable Logic Device (CPLD), a Field Programmable Gate Array (FPGA) device, an Application Specific Integrated Circuit (ASIC) device.

To illustrate with an oversimplified example, assume a physical processor is executing a graphics intensive program. As a result, an accelerator in another processor socket is configured to accelerate graphics calculations, such as 3D lighting calculations or vertices translation. In response to a context switch or during parallel execution, the physical processor begins executing a video program with intensive video compression. As a result, during runtime of the computer system, the processor may dynamically execute a reconfiguration module, as described above, to reconfigure the accelerator device from accelerating graphics calculations to accelerating video compression.

Therefore, as can be seen from above, an accelerator device may be placed in a processor socket, which potentially enables better memory throughput. However, without I/O bus defined protocols to initialize the accelerator device, direct inter-processor messaging is utilized to initialize a configuration space of the accelerator device, which may be associated with configuration registers of the accelerator, as well as a general memory/communication area for the accelerator. As the size of a base address and size for the configuration space may be too large for data vectors of existing inter-processor communication, a set of inter-processor messages may be utilized to communicate bases and sizes of memory space. Furthermore, the accelerator may be dynamically reconfigured during runtime utilizing inter-processor messaging or writes to memory to provide flexible acceleration support.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage device, optical storage devices, acoustical storage devices or other form of propagated signal (e.g., carrier waves, infrared signals, digital signals) storage device; etc. For example, a machine may access a storage device through receiving a propagated signal, such as a carrier wave, from a medium capable of holding the information to be transmitted on the propagated signal.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
an accelerator device to be electrically coupled in a processor socket of a multi-processor socket computer system, wherein the accelerator device is to interface with a system memory in the computer system through a host bus, and wherein the accelerator device is capable of being dynamically re-configured during runtime of the computer system from accelerating a first processing task to accelerating a second processing task, and wherein the accelerator device is to receive a set of inter-processor interrupts (IPIs) from at least a processor in the computer system to initialize an acceleration configuration space within memory, the set of IPIs comprising: an initialization IPI to begin initialization of the accelerator device; a first plurality of base address IPIs to indicate a physical base address for the acceleration configuration space; and a second plurality of size IPIs to indicate a size of the acceleration configuration space.

2. The apparatus of claim 1, wherein the accelerator device is implemented in a device selected from a group consisting of a Programmable Array Logic (PAL) device, a Programmable Logic Device (PLD), a Complex Programmable Logic Device (CPLD), a Field Programmable Gate Array (FPGA) device, an Application Specific Integrated Circuit (ASIC) device.

3. The apparatus of claim 1, wherein the first processing task and the second processing task are each independently selected from a group consisting of a matrix inversion task, a graphics computation task, a floating point computation task, a memory access task, a network access task, a compression task, a decompression task, an encryption task, a decryption task, an authentication task, a mathematical computation task, and a media task.

4. The apparatus of claim 1, wherein the host bus is selected from a group consisting of a point-to-point serial bus, a multi-drop parallel bus, and a point-to-point parallel bus.

5. A computer readable non-transitory storage medium including program code which, when executed by a machine, causes the machine to perform the operations of:
determining an identifier for an accelerator device in a processor slot of a multi-processor computer system; and
transmitting a plurality of inter-processor messages to the accelerator device based on the identifier to initialize the accelerator device, wherein transmitting a plurality of inter-processor messages to the accelerator device based on the identifier comprises transmitting a plurality of inter-processor interrupts (IPIs), wherein each of the plurality of IPIs include a representation of the identifier, a sequence number to indicate a position within the plurality of IPIs, and a data portion, and wherein the plurailty of IPIs includes: a first IPI to indicate a beginning of the plurality of IPIs; a first number of IPIs, the data portion from each of the first number of IPIs, when aggregated by the accelerator device, to define a base address of an accelerator configuration space; and a second number of IPIs, the data portion from each of the second number of IPIs, when aggregated by the accelerator device, to define a size of the accelerator configuration space.

6. The computer readable medium of claim 5, wherein the processor slot includes a processor socket and the identifier includes a socket number.

7. The computer readable medium of claim 5, wherein the program code which, when executed by the machine, further causes the machine to perform the operations of: transmitting a reconfigure inter-processor message to the accelerator device during runtime of the machine, the accelerator device to enter a reconfiguration state in response to receiving the reconfigure inter-processor message.

8. A system comprising:
a physical processor electrically coupled in a first processor socket and an accelerator device electrically coupled in a second processor socket; and
a memory device coupled to the plurality of sockets, the memory device to hold initialization code;
wherein the physical processor, in response to executing the initialization code, is to transmit a set of socket-to-socket messages to the second processor socket to initialize the accelerator device, the set of socket-to-socket messages to include a set of inter-processor interrupts (IPIs), wherein each IPI in the set of IPIs is to include a destination field to reference the second socket, a sequence field to indicate an ordering sequence within the set of IPIs, and a data field to hold data, and wherein the set of IPIs include: an initialization IPI to indicate to the accelerator device that initialization information is going to be transmitted; a first number of base address IPIs, the data field from each of the first number of base address IPIs, when aggregated by the accelerator device, to indicate a base address for an accelerator memory space; and a second number of size IPIs, the data field from each of the second number of size IPIs, when aggregated by the accelerator device, to indicate a size for the accelerator memory space.

9. The system of claim 8, wherein the accelerator device is implemented in a device selected from a group consisting of a Programmable Array Logic (PAL) device, a Programmable Logic Device (PLD), a Complex Programmable Logic Device (CPLD), a Field Programmable Gate Array (FPGA) device, an Application Specific Integrated Circuit (ASIC) device, and wherein the accelerator device is to accelerate a processing task selected from a group consisting of a matrix inversion task, a graphics computation task, a floating point computation task, a memory access task, a network access task, a compression task, a decompression task, an encryption task, a decryption task, an authentication task, a mathematical computation task, and a media task.

10. The system of claim 8, wherein the memory device is also to hold a plurality of reconfiguration code modules, and wherein, the physical processor, in response to executing one of the reconfiguration code modules, is to reconfigure the acceleration device from accelerating a first processing function to a second processing function.

11. A method comprising:
determining a processor socket of a plurality of processor sockets in a computer system that is associated with an accelerator device during boot of the computer system;
executing initialization code on a physical processor associated with another socket of the plurality of processor sockets in the computer system; and
transmitting a plurality of inter-processor messages from the physical processor to the socket associated with the accelerator device to initialize a memory space to be associated with the accelerator device, wherein transmitting a plurality of inter-processor messages from the physical processor to the socket associated with the accelerator device to initialize a memory space to be associated with the accelerator device comprises: transmitting a first number inter-processor messages of the plurality of inter-processor messages to identify a base address of the memory space; and transmitting a second number of the plurality of inter-processor messages to identify a size of the memory space, and wherein the plurality of inter-processor messages include inter-processor interrupts (IPIs), the first number of IPIs each include a destination field to identify the processor socket associated with the accelerator device, a sequence field to identify an ordering sequence of the first number of IPIs, and a data field to hold a portion of a value to represent the base address of the memory space, and the second number of IPIs each include a destination field to identify the processor socket associated with the accelerator device, a sequence field to identify an ordering sequence of the second number of IPIs, and a data field to hold a portion of a value to represent the size of the memory space.

12. The method of claim 11, wherein transmitting a plurality of inter-processor messages from the physical processor to the socket associated with the accelerator device to initialize a memory space to be associated with the accelerator device is in response to executing accelerator initialization code on the physical processor.

13. The method of claim 11, wherein the accelerator device includes a programmable micro-engine.

14. The method of claim 13, further comprising executing reconfiguration code on the physical processor and transmitting a plurality of reconfiguration commands to the accelerator device to initiate reconfiguration of the programmable micro-engine to accelerate a different processing function from a current accelerated processing function.

15. The method of claim 13, wherein transmitting the plurality of reconfiguration commands comprises writing the plurality of reconfiguration commands to a portion of the memory space to be associated with the accelerator device after the memory space is initialized to be associated with the accelerator device.

16. The method of claim 13, wherein transmitting the plurality of reconfiguration commands comprises transmitting a plurality of inter-processor interrupts (IPIs), each IPI including a destination field to indicate the processor socket associated with the accelerator device, a sequence number to indicate an ordering sequence of the plurality of reconfiguration commands, and a data portion to hold at least a portion of a reconfiguration command of the plurality of reconfiguration commands.

* * * * *

UNITED STATES PATENT AND TRADEMARK OFFICE
CERTIFICATE OF CORRECTION

| | | |
|---|---|---|
| PATENT NO. | : 8,082,418 B2 | |
| APPLICATION NO. | : 11/958080 | |
| DATED | : December 20, 2011 | |
| INVENTOR(S) | : Paul M. Stillwell, Jr. et al. | |

It is certified that error appears in the above-identified patent and that said Letters Patent is hereby corrected as shown below:

In column 12, line 36, in claim 5, delete "plurailty" and insert -- plurality --, therefor.

Signed and Sealed this
Thirteenth Day of March, 2012

David J. Kappos
*Director of the United States Patent and Trademark Office*